Sept. 23, 1924.  
W. G. DANIEL  
LOG CARRIER  
Filed May 22, 1923
1,509,716
2 Sheets-Sheet 2
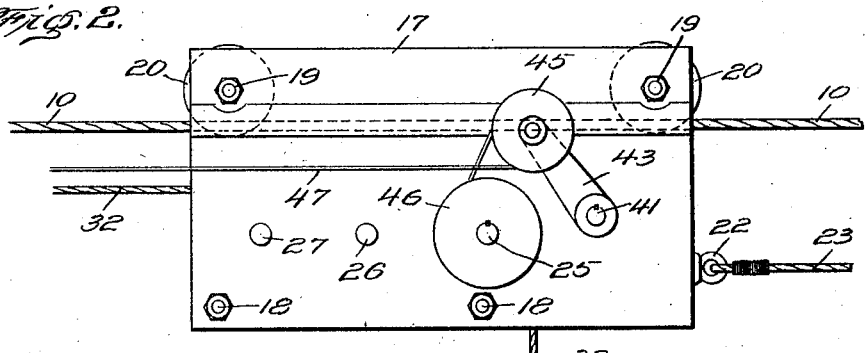
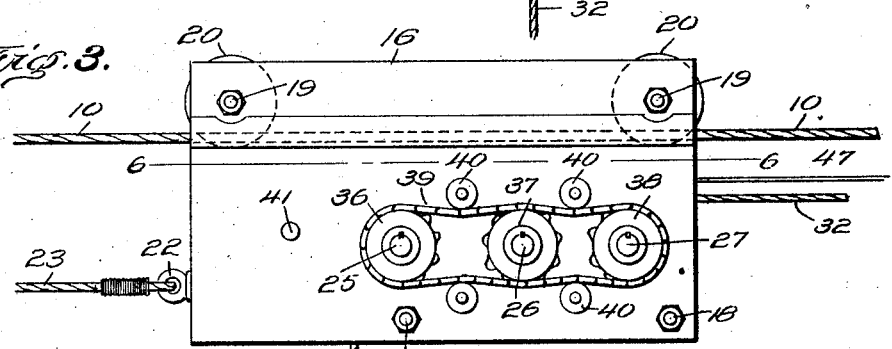
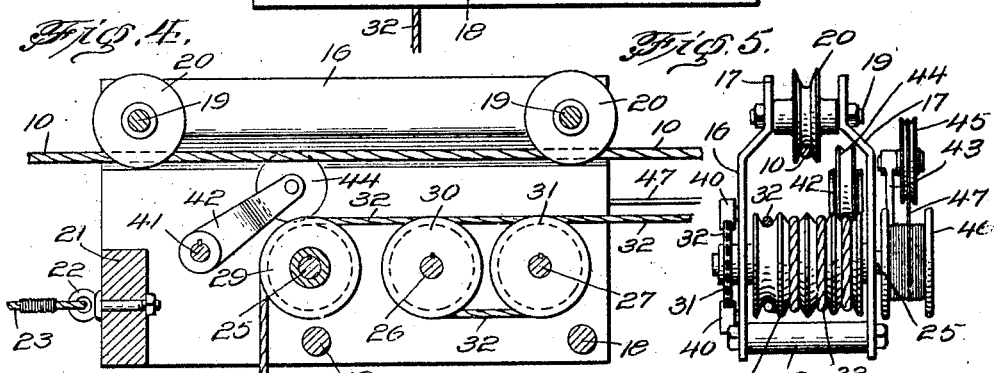
INVENTOR.  
*William G. Daniel.*  
BY  
*Geo. F. Kimmel*  
ATTORNEY.

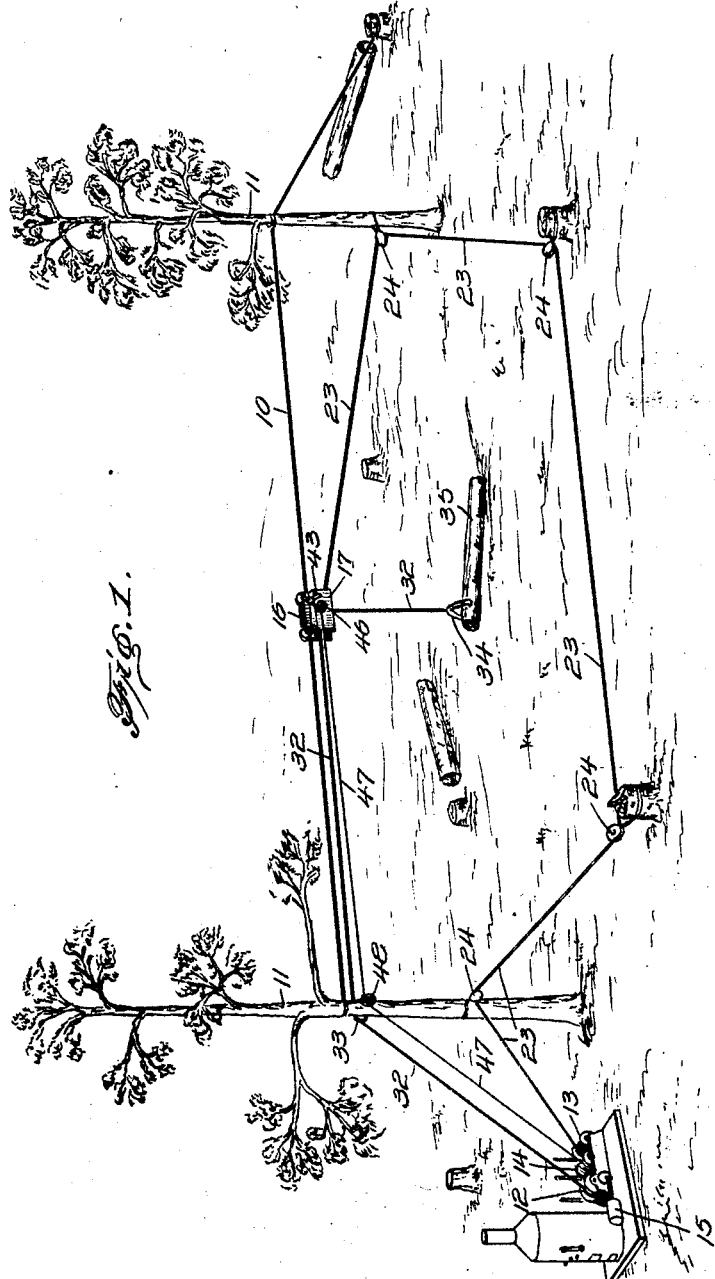

Patented Sept. 23, 1924.

1,509,716

UNITED STATES PATENT OFFICE.

WILLIAM G. DANIEL, OF SUNBURST, NORTH CAROLINA.

LOG CARRIER.

Application filed May 22, 1923. Serial No. 640,719.

*To all whom it may concern:*

Be it known that I, WILLIAM G. DANIEL, a citizen of the United States, residing at Sunburst, in the county of Haywood and State of North Carolina, have invented certain new and useful Improvements in Log Carriers, of which the following is a specification.

This invention relates to overhead log handling or "skidding" apparatus, and has for one of its objects to provide an improved construction of the wheeled carriage which travels back and forth on the "sky line" cable of the apparatus.

Another object of the invention is to provide a device of this character wherein means are provided for returning the major pull cable to log engaging position, and applying a brake to the hoisting cable during the in-haul action.

With these and other objects in view, the invention consists in certain novel features of construction as hereinafter shown and described and then specifically pointed out in the claim, and in the drawings illustrative of the preferred embodiment of the invention, Figure 1 is a perspective view of the improved apparatus, as a whole.

Fig. 2 is an enlarged elevation of the improved travelling carriage viewed from one side.

Fig. 3 is an enlarged elevation of the improved travelling carriage viewed from the other side.

Fig. 4 is a longitudinal section of the carriage.

Fig. 5 is an end elevation of the carriage.

Fig. 6 is a plan view in section, on the line 6—6 of Fig. 3.

The improved apparatus includes an elevated "sky line" cable 10 strained between suitable supports, for instance, two trees represented at 11, and a plurality of winding drums represented conventionally at 12, 13 and 14 and adapted to be operated by a suitable motor indicated at 15.

A wheeled carriage is mounted to travel back and forth upon the sky line cable, the carriage including spaced side members 16 and 17 maintained in spaced relation by transverse stay members 18. Short shafts or studs 19 are supported in the side members 16 and 17 near their tops and support cable engaging grooved carrier wheels 20 which engage the sky line cable 10. The carriage side members 16 and 17 are also connected to a transverse member 21 in which an eye 22 is secured to support one end of a cable 23, the latter leading around suitable pulley blocks 24, suitably supported and the cable connected to the winding drum 13.

Mounted for rotation through the carriage side members 16 and 17 in spaced relation, are a plurality of shafts, for instance three, and indicated by the characters 25, 26 and 27. The shaft 25 carries a cable guide pulley 29 having a single cable channel, while the shafts 26 and 27 are provided respectively with cable guide pulleys 30 and 31, each having three cable guide channels.

The major pull cable, represented at 32, is connected at one end to the winding drum 12 and leads thence through a guide pulley block 33 attached to the adjacent support 11 and thence around the three channel guide pulleys 30 and 31 and thence over the single channelled guide pulley 29 and terminates in a suitable "grip" device indicated at 34 for engaging the logs, one of which is indicated at 35. The shafts 25, 26 and 27 are provided respectively with chain pulleys 36, 37 and 38, for illustration externally of the member 16 of the carriage, to receive an endless chain 39, so that the motion of the shafts is positively transmitted from one to the other.

Idler rollers 40 are arranged to engage the chain 39, to increase the grip of the chain upon the intermediate chain pulley 37. By this means the force required to elevate the log is materially economized.

Journalled in the carriage side members is a rock shaft 41, and rigidly connected to the rock shaft at opposite sides of the side member 17 are arms 42 and 43.

A bearing roller 44 is carried by the arm 42 in position to engage the major pull cable 32 where it passes over the guide pulley 29, while the arm 43 carries a relatively small cable guide pulley 45.

Mounted to rotate with the shaft 25 is a small winding drum 46 to which a minor pull cable 47 is attached at one end and looped around the guide pulley 45 and conducted thence through a pulley block 48 attached to one of the supports 11 and thence to the winding drum 14, as shown in Fig. 1.

The supports 11 may be any required distance apart, depending on the distribution of the logs to be "skidded" or "snaked" to the point where they are to be loaded upon cars or other vehicles for transportation, and the winding drum 13 actuated to cause the cable 23 to draw the carriage to a point above the log to be moved.

The drum 14 is then actuated to rotate the winding drum 46 and correspondingly rotate the cable pulley 29 to draw the major pull cable 32 reversely to its log elevating motion, to lower the grip device 34 to a position to engage the log. At the same time that the minor pull cable is operated, the rock shaft 41 is likewise rotated through the action of the loop of the cable 47 around the guide pulley 45 which thus pulls the arms 42 and 43 toward the shaft 25 and presses the bearing roller 44 firmly against the major pull cable where it passes around the pulley 29 and thus causes the cable to grip the latter with sufficient force to pull the cable reversely around the pulleys 30 and 31, and lower the portion of the major pull cable which carries the log grip into log engaging position.

After the log has been transported to the place of delivery and the grip released, it is necessary to return the grip member 34 to log engaging position, but its weight is not sufficient to cause it to move downward by gravity against the resistance of the multiple channelled guide pulleys 30 and 31, hence the importance and advantage of the simple means disclosed for accomplishing this result.

The improved device is simple in construction, can be manufactured of any required size and of any suitable material, and installed wherever required and to operate upon logs however distributed or at whatever distance.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed as new is:

In an apparatus of the class described, a support including spaced side members, a shaft member for rotation through said side members and extending at one end beyond one of said side members, a cable guide pulley fast upon said shaft between said side members, a cable winding drum fast to the extended portion of said shaft, a rock shaft mounted through said side members and extending at one end beyond the same, an arm attached to said rock shaft between said side members, a bearing pulley carried by said arm and adapted to bear on a cable member where it passes around said guide pulley, an arm attached to the extended terminal of said rock shaft, an idler cable guide pulley carried by said last mentioned arm at its free end, and a pull cable connected at one end to the winding drum and passing thence around the idler pulley, whereby when strain is applied to the pull cable the drum will be rotated and the bearing pulley forced against a cable passing over the guide pulley.

In testimony whereof, I affix my signature hereto.

WILLIAM G. DANIEL.